(12) United States Patent
Okamoto et al.

(10) Patent No.: US 8,782,049 B2
(45) Date of Patent: Jul. 15, 2014

(54) KEYWORD PRESENTING DEVICE

(75) Inventors: Masayuki Okamoto, Kawasaki (JP);
Nayuko Watanabe, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 422 days.

(21) Appl. No.: 12/883,626

(22) Filed: Sep. 16, 2010

(65) Prior Publication Data

US 2011/0246464 A1 Oct. 6, 2011

(30) Foreign Application Priority Data

Mar. 31, 2010 (JP) .................................. 2010-084329

(51) Int. Cl.
G06F 17/30 (2006.01)
G06F 17/27 (2006.01)

(52) U.S. Cl.
CPC ............ G06F 17/3071 (2013.01); G06F 17/27 (2013.01)
USPC ........... 707/737; 707/805; 715/237; 715/257; 704/9

(58) Field of Classification Search
CPC ................ G06F 17/27; G06F 17/3071; G06F 17/30864; G06F 17/30598; G06F 17/30705; G06F 17/30265
USPC .................. 707/737, E17.089, 758, E17.009, 707/E17.022, 805; 715/237, 257, FOR. 243; 704/9, E15.02, 7
See application file for complete search history.

(56) References Cited

U.S. PATENT DOCUMENTS 7,373,171 B2 * 5/2008 Nakai .......................... 455/552.1
7,502,781 B2 * 3/2009 Garber et al. ..................... 704/7
7,840,577 B2 * 11/2010 Ortega et al. .................. 707/758
8,312,057 B2 * 11/2012 John .............................. 707/804
8,620,658 B2 * 12/2013 Nakade et al. ................. 704/257
2002/0152204 A1 * 10/2002 Ortega et al. ...................... 707/3
2003/0069867 A1 * 4/2003 Coutts et al. ................... 706/20
2003/0140309 A1 * 7/2003 Saito et al. .................... 715/500
2004/0243392 A1 * 12/2004 Chino et al. ....................... 704/7

(Continued)

FOREIGN PATENT DOCUMENTS

JP 09-044525 2/1997
JP 2002-269135 9/2002

(Continued)

OTHER PUBLICATIONS

Wei Li, Jian-Yi Liu, and Cong Wang—"Web Document Duplicate Removal Algorithm Based on Keyword Sequences"—Natural Language Processing and Knowledge Engineering, 2005. IEEE (NLP-KE '05.)—Oct. 30-Nov. 1, 2005—(pp. 511-516).*

(Continued)

*Primary Examiner* — Anh Ly
(74) *Attorney, Agent, or Firm* — Amin, Turocy & Watson, LLP

(57) ABSTRACT

In one embodiment, there is provided a keyword presenting device including: an extraction unit configured to extract a plurality of keywords from a browsing document; a determination unit configured to arrange keywords with spellings similar to each other among the plurality of keywords to obtain a plurality of groups of similar keyword; an integration unit configured to classify the keywords into main keywords that are titles and the other sub-keywords for each group of similar keywords, and to integrate the sub-keywords into the main keywords; and a presentation unit configured to present the main keywords to a user.

11 Claims, 13 Drawing Sheets

(56) References Cited

U.S. PATENT DOCUMENTS

| | | | |
|---|---|---|---|
| 2005/0071332 A1* | 3/2005 | Ortega et al. | 707/4 |
| 2005/0125219 A1* | 6/2005 | Dymetman et al. | 704/9 |
| 2005/0278292 A1* | 12/2005 | Ohi et al. | 707/1 |
| 2006/0100956 A1* | 5/2006 | Ryan et al. | 705/37 |
| 2006/0117003 A1* | 6/2006 | Ortega et al. | 707/4 |
| 2008/0159338 A1* | 7/2008 | Iida | 370/535 |
| 2008/0288308 A1* | 11/2008 | Penney et al. | 705/7 |
| 2008/0294619 A1* | 11/2008 | Hamilton et al. | 707/5 |
| 2009/0055185 A1* | 2/2009 | Nakade et al. | 704/257 |
| 2009/0083255 A1* | 3/2009 | Li | 707/5 |
| 2009/0112732 A1* | 4/2009 | Devlin et al. | 705/26 |
| 2009/0177463 A1* | 7/2009 | Gallagher et al. | 704/10 |
| 2009/0177627 A1* | 7/2009 | Yoon et al. | 707/3 |
| 2009/0248671 A1* | 10/2009 | Maruyama et al. | 707/5 |
| 2009/0271825 A1* | 10/2009 | Ryu et al. | 725/44 |
| 2009/0292677 A1* | 11/2009 | Kim | 707/3 |
| 2009/0299998 A1* | 12/2009 | Kim | 707/5 |
| 2010/0161406 A1* | 6/2010 | Narayan Vedam | 705/14.41 |
| 2010/0169075 A1* | 7/2010 | Raffa et al. | 704/9 |
| 2010/0208984 A1* | 8/2010 | Bilenko et al. | 382/161 |
| 2011/0016142 A1* | 1/2011 | Chen et al. | 707/758 |
| 2011/0246464 A1* | 10/2011 | Okamoto et al. | 707/737 |
| 2012/0036144 A1 | 2/2012 | Okamoto et al. | |

FOREIGN PATENT DOCUMENTS

| | | |
|---|---|---|
| JP | 2006-134183 | 5/2006 |
| JP | 2008-282322 | 11/2008 |
| JP | 2009-129098 | 6/2009 |

OTHER PUBLICATIONS

Jianwei Zhang, Yukiko Kawai and Tadahiko Kumamoto—"A Flexible Re-ranking System Based on Sub-keyword Extraction and Importance Adjustment"—IAENG International Journal of Computer Science, 37:3, IJCS_37_3_10—Advance online publication: Aug. 19, 2010—(p. 1-8).*

Jun Xie, Ming Zhang, Tao Zhou, Xia Hua, LiSha Tang and Weilin Wu—"Sno/scaRNAbase: a curated database for small nucleolar RNAs and cajal body-specific RNAs"—Oxford JournalsLife Sciences Nucleic Acids ResearchVolume 35, Issue suppl. (pp. D183-D187).*

Bernard A. Weerdmeester—"Keywords Instead of Hierarchical Menus"—Human-Computer Interaction, 1988, pp. 392-403.*

Japanese Office Action for Japanese Application No. 2010-084329 mailed on Nov. 8, 2011.

Japanese Office Action for Japanese Application No. 2010-084329 mailed on Jun. 28, 2012.

* cited by examiner

FIG. 4

SAKANA-SAN SYNDROME
SAKANA-SAN SYNDROME IS THE
POPULARNAME OF SYMPTOMS OF
COMPLAINING OF DEPRESSION,
BAD HEALTH, OR LETHARGY DUE
TO HAVING TO FACE REALITY OF
GOING TO SCHOOL OR WORK ON
THE NEXT DAY AFTER WATCHING
TV ON SUNDAY EVENING OR LATE
AT NIGHT, PARTICULARLY, AFTER
"SAKANA-SAN" BROADCASTED
BY FUJIYAMA TELEVISION AT
6:30 ON SUNDAY EVENINGS.
......

TEXT BODY OF BROWSED DOCUMENT

⇨

-KEYWORD: SAKANA-SAN
 MEANING ATTRIBUTE: TITLE
 SCORE: 10
-KEYWORD: SAKANA-SAN SYNDROME
 MEANING ATTRIBUTE: DISEASE NAME
 SCORE: 8
-KEYWORD: FUJIYAMA TELEVISION
 MEANING ATTRIBUTE: COMPANY
 SCORE: 8
 ...

EXAMPLE OF EXTRACTED KEYWORD
AND MEANING ATTRIBUTE

FIG. 5

| MEANING ATTRIBUTE | SEARCH METHOD | SEARCH SERVICE | EXTENSION QUERY |
|---|---|---|---|
| TITLE | MOVIE | http://www... | AND PICTURE |
| COMPANY | STOCK PRICE SEARCH | http://stock... | MEANING ATTRIBUTE |
| DISEASE NAME | HEALTH INFORMATION | http://www... | AND (HEALTH or DISEASE) |
| ... | ... | ... | ... |
| ... | ... | ... | ... |

FIG. 6

| SPELLING PATTERN |
|---|
| \| (KEYWORD 1) ∩ (KEYWORD 2) \| ≧3 →<br>(KEYWORD 1) AND (KEYWORD 2) ARE SIMILAR |
| (PERSON'S NAME 2) a.k.a. (PERSON'S NAME 1) →<br>(PERSON'S NAME 1) AND (PERSON'S NAME 2) ARE SIMILAR |
| (PERSON'S NAME 1) ((ENGLISH LETTERS 1)) →<br>(PERSON'S NAME 1) AND (ENGLISH LETTERS 1) ARE SIMILAR |
| ... |

*FIG. 7*

| MAIN KEYWORD ID | SUB-KEYWORD ID | TITLE | TITLE MEANING ATTRIBUTE | KEYWORD SCORE |
|---|---|---|---|---|
| 1 | 0 | SAKANA-SAN | PROGRAM TITLE | 10 |
| 1 | 1 | SAKANA-SAN SYNDROME | DISEASE NAME | 8 |
| 1 | 2 | FULL LENGTH SAKANA-SAN STORY | MOVIE TITLE | 6 |
| 1 | ... | ... | ... | ... |
| 2 | 0 | FUJIYAMA TELEVISION | COMPANY | 8 |
| 2 | 1 | ... | ... | ... |
| ... | ... | ... | ... | ... |

US 8,782,049 B2

KEYWORD PRESENTING DEVICE

CROSS-REFERENCE TO THE RELATED APPLICATION(S)

The present application is based upon and claims priority from prior Japanese Patent Application No. 2010-084329, filed on Mar. 31, 2010, the entire contents of which are incorporated herein by reference.

FIELD

Embodiments described herein generally relate to a keyword presenting device that presents a keyword used as a query for searching related information to a user who is browsing text information.

BACKGROUND

There is a demand for simply searching and receiving of related information when browsing text information such as Web pages and documents (hereinafter, simply referred to as document). Hitherto, a method of extracting a noted word designated by a user and surrounding words thereof as a keyword and searching Web pages has been proposed. An example of such method is disclosed in JP-A-2009-129098.

However, in the conventionally proposed method, when a screen is small such as in a mobile terminal display, the whole page cannot be displayed at a time. Accordingly, a keyword which a user had seen in another part in the page could not be used.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

FIG. 4 is a diagram illustrating a text body, and keywords, meaning attributes, and scores extracted from the text body.

FIG. 5 is a diagram illustrating an example of search rules.

FIG. 6 is a diagram illustrating an example of similar keyword determining rules.

FIG. 7 is a diagram illustrating an example of structures of integrated main keywords and sub-keywords.

DETAILED DESCRIPTION

Figure 1:
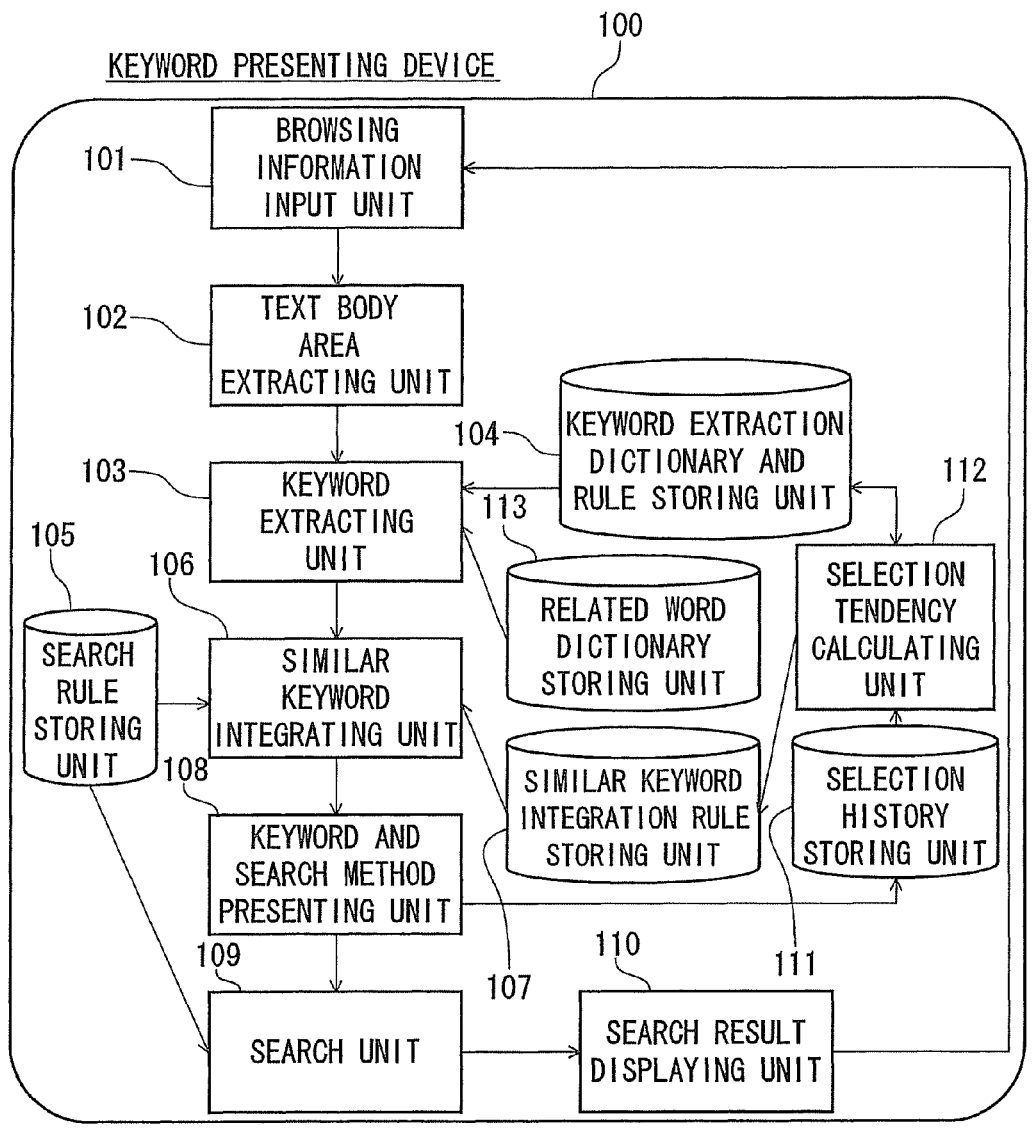
FIG. 1 is a block diagram illustrating an overall configuration of a keyword presenting device according to an embodiment.

According to the embodiments described herein, there is provided a keyword presenting device including: an extraction unit configured to extract a plurality of keywords from a browsing document; a determination unit configured to arrange keywords with spellings similar to each other among the plurality of keywords to obtain a plurality of groups of similar keyword; an integration unit configured to classify the keywords into main keywords that are titles and the other sub-keywords for each group of similar keywords, and to integrate the sub-keywords into the main keywords; and a presentation unit configured to present the main keywords to a user.

Embodiments according to the present invention will be described in detail with reference to the accompanying drawings. The scope of the claimed invention should not be limited to the examples illustrated in the drawings and those described in below.

In the embodiment, it is assumed that a keyword presenting device 100 is used in a terminal held by a user, but the same is applied even when a part of the keyword presenting device 100 is separated and used, for example, a part thereof is configured in a server. In the embodiment, a Web page is the main target for browsing information or documents. Cases where the Web page includes a still image and a video movie in addition to text information are handled in the same manner.

FIG. 1 is a block diagram illustrating an overall configuration of the keyword presenting device 100 according to the embodiment. A browsing information input unit 101 is a display of a mobile terminal and displays a browsing window for inputting document text information. A text body area extracting unit 102 extracts an area considered as a text body from document structure information such as HTML input by the browsing information input unit 101. A keyword extracting unit 103 extracts search query candidate words from the text body area of the document input by the browsing information input unit 101 as a keyword. A keyword extraction dictionary and rule storing unit 104 stores words and extraction rules necessary to extract keywords in the keyword extracting unit 103. The search rule storing unit 105 stores (i) search methods, (ii) search services to use, and (iii) rules for determining extension queries, which correspond to meaning attributes of the keywords extracted by the keyword extracting unit 103. There may be no extension query in some cases.

A similar keyword integrating unit 106 determines a keyword integrated as a title from the plurality of keywords extracted by the keyword extracting unit 103. A similar keyword integration rule storing unit 107 stores rules which determine integration methods of the similar keyword integrating unit 106. A keyword and search method presenting unit 108 presents a title list of keywords, spelling of which is integrated by the similar keyword integrating unit 106. A search unit 109 performs a search process on a web service (e.g., external search service) or a database on the basis of user's selection of the keywords presented by the keyword and search method presenting unit 108, and arranges the search results. A search result displaying unit 110 displays a list of the results searched by the search unit 109. A selection history storing unit 111 stores history of the keywords selected by the user among the keywords presented by the keyword and search method presenting unit 108. A selection tendency calculating unit 112 calculates statistic information of the keyword or search method selected by the user on the basis of the selection history stored in the selection history storing unit 111, and reflects the statistic information to the keyword extraction dictionary and rule storing unit 104 or the similar keyword integration rule storing unit 107. A related word dictionary storing unit 113 is used to add other keywords (the other keywords must be words in the text body area) related to the keywords displayed in the text body area to the extraction result, in the keyword extraction performed by the keyword extracting unit 103. Herein, the related words are synonyms, superordinate words, subordinate words, and the like, and examples of related words of "personal computer" are "computer", "PC", and the like.

Figure 2:
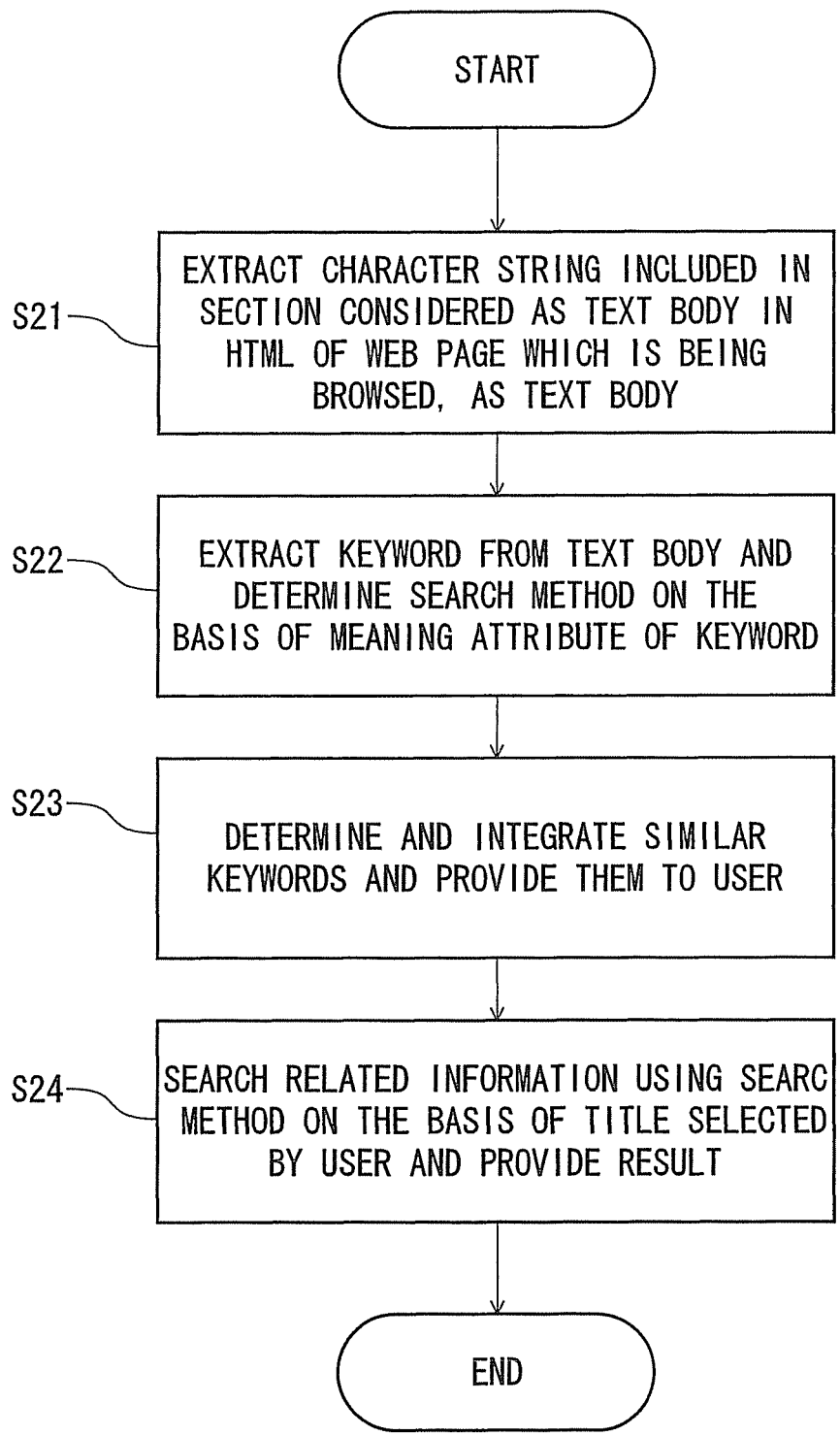
FIG. 2 is a flowchart illustrating a keyword presenting operation according to the embodiment.

FIG. 2 is a flowchart illustrating a keyword presenting operation of the keyword presenting device according to the embodiment.

First, an area corresponding to a text body is extracted from a document structure (e.g., HTML type document structure) of a Web page which is being browsed by a user (Step S21). In the embodiment, a tag representing a paragraph, a tag representing a text body, a menu, or an area including a certain amount of text information is considered as the text body area, thereby text information that is the text body is extracted.

After the text body is extracted, keyword extraction is performed (Step S22). A meaning attribute such as a person's name and a place name is given to the extracted keyword. A search method is determined according to the meaning attribute. A user searches related information of a browsing Web page using the extracted keyword and the search method.

After the keyword is extracted, similar keywords are determined and integrated (Step S23). Herein, similarity means that there is a superficial inclusion relation among keywords, or in other words, a user can easily recognize similarity but spellings are different, such as abbreviation and other language transcription. Groups of similar keyword are classified into main keywords that are titles and sub-keywords that are selectable by an operation on the titles, and are integrated into the main keywords. The titles (i.e., main keywords) of the integrated keywords groups and a list of the search methods are finally arranged in parallel and presented to the user. In such a manner, when keywords appearing in the page are presented as search query candidates, it is possible to integrate and present keywords with similar spellings.

When the user selects the presented title or the search method, search of Web or database corresponding to the selected title or search method is performed and the search results are presented to the user (Step S24). When the user selects a desired result from the search results, the Web page is changed to the corresponding Web page, and the user can continue the browsing of the related information.

A specific example of the presentation of the keywords will be described with reference to FIG. 3 through to FIG. 9B.

Figure 3:
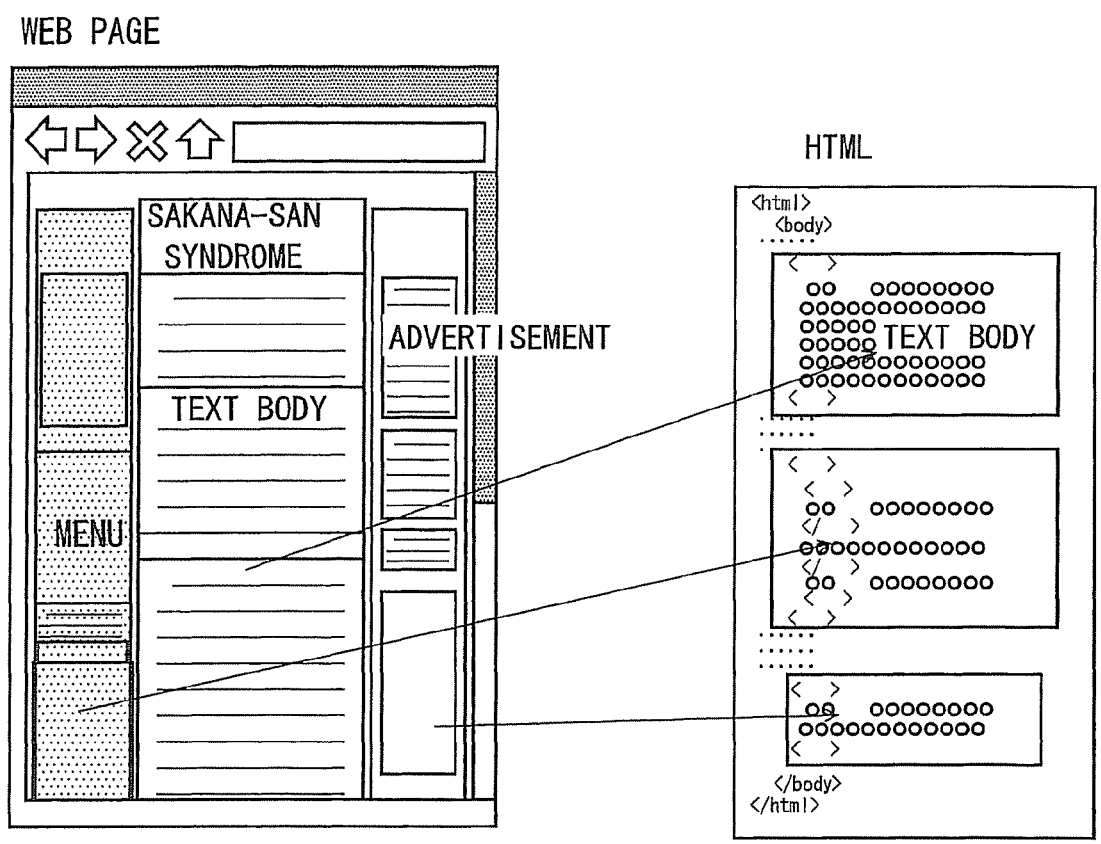
FIG. 3 is a diagram illustrating a specific example of a Web page browsing screen and text body extraction.

FIG. 3 shows a specific example of a Web page browsing screen window and text body extraction. The left part of FIG. 3 shows the Web page browsing screen window, and a browsing example of a news article input to the browsing unit input unit 101. The article text body is described on a center column separately for each paragraph, and a title of the article, "Sakana-san Syndrome" is displayed above the article text body. A menu such as a drawing and a caption is displayed on the left of the text body, and advertisements are displayed on the right of the text body.

The right part of FIG. 3 is an example illustrating correspondence relation between areas of the Web page and HTML type document structures. Each of the areas is configured in a hierarchical manner by HTML tags. In the embodiment, extraction is perform where the article of the text body is assumed to be in a range of a large amount of sentences and an area where a length of a character string surrounded by a specific tag (e.g., tag representing paragraph) is longer than a predetermined threshold value is considered as a text body. As a result, information such as the menu or the advertisements of the Web site which is not directly related to the content of the page browsed by the user is omitted, and keywords corresponding to the text body being browsed are easily picked out. Even when the content of the text body of the browsing Web page is long and the content of the whole text body of the Web page cannot be displayed on the display window of the mobile terminal, all the keywords seen at other parts in the same Web page can be extracted without having to renew the display again by a scroll operation or the like.

FIG. 4 shows an example of the text body. The left part of FIG. 4 is an example of the text body extracted from the browsing document, as a result of the text body extracting process. In the example, an article written about a disease name called "Sakana-san Syndrome" is shown. As an example of characteristic expression that is a keyword of a person's name and a place name, "Sakana-san Syndrome" as a disease name, "Fujiyama television" as a broadcasting company, "Sakana-san" as a program name, and the like are extraction targets.

First, keywords of a text included in the text body area are extracted (Step S22). As a keyword extracting method, a general keyword extracting method is used such as morpheme analysis, a characteristic expression extracting process, and matching with words included in a previously registered dictionary. Herein, priority used for an extraction dictionary or rule may be represented as a score, and keyword selection tendency of a user, to be described later, may be reflected by laying emphasis thereupon. The right part of FIG. 4 shows a list of extracted keywords, meaning attributes, and scores.

FIG. 5 shows an example of search rules where the meaning attributes and the search methods of the keywords are associated with each other. Search services used when selecting keywords and search methods corresponding to meaning attributes and extension queries corresponding to the search methods are stored in the search rule storing unit 105.

A search method corresponding to a keyword is finally presented to the user as will be described later. A plurality of search methods may correspond to one meaning attribute.

Similar keywords are determined, integrated, and presented to the user (Step S23). Rules on determining the similar keywords are stored in the similar keyword integration rule storing unit 107. FIG. 6 shows an example of these determination rules. In this determination rule, a relation that two or more keywords are similar is described by a keyword spelling pattern, for example, "if a common part of keyword 1 and keyword 2 is 3 or more characters, keyword 1 and keyword 2 are similar", "if there is a spelling of 'person's name 1 concerns person's name 2', person's name 1 and person's name 2 are similar", and the like. As a result, a group of similar keywords is determined and the group of similar keywords is formed. As described above, the keyword spelling pattern has similarity in spelling such as inclusion relations of spelling, reading in different pronunciation and meaning, abbreviations, terms of endearment, and nicknames.

A main keyword is acquired from the group of similar keywords. The main keyword is presented as a representative title to the user. The main keyword is determined by an attribute of a keyword. For example, the main keyword is determined by the highest score of the keyword, the shortest spelling, a meaning attribute with the high priority, and the like. In the embodiment, a similar keyword with the highest score is set as the main keyword, and the other similar keywords are arranged as sub-keywords in order of score, thereby integrating the similar keywords. Accordingly, when keywords having a superficial inclusion relation in the page are presented as candidates of search queries, complicated arrangement of keywords with similar spellings can be avoided. In addition, when keywords are integrated and presented, it is easy to select the spelling pattern to be presented.

FIG. 7 shows a structure example of the main keywords and the sub-keywords integrated by the similar keyword integrating unit 106. "Sakana-san", "Fujiyama television", and the like are selected as the main keywords, and IDs are sequentially given thereto. "Sakana-san Syndrome", "Full Length Sakana-san" Story, and the like are integrated as the sub-keywords subordinated to "Sakana-san" (main keyword ID is 1), the same "1" as "Sakana-san" is given to such a main keyword, and sub-keyword IDs are sequentially given thereto.

Figure 8:
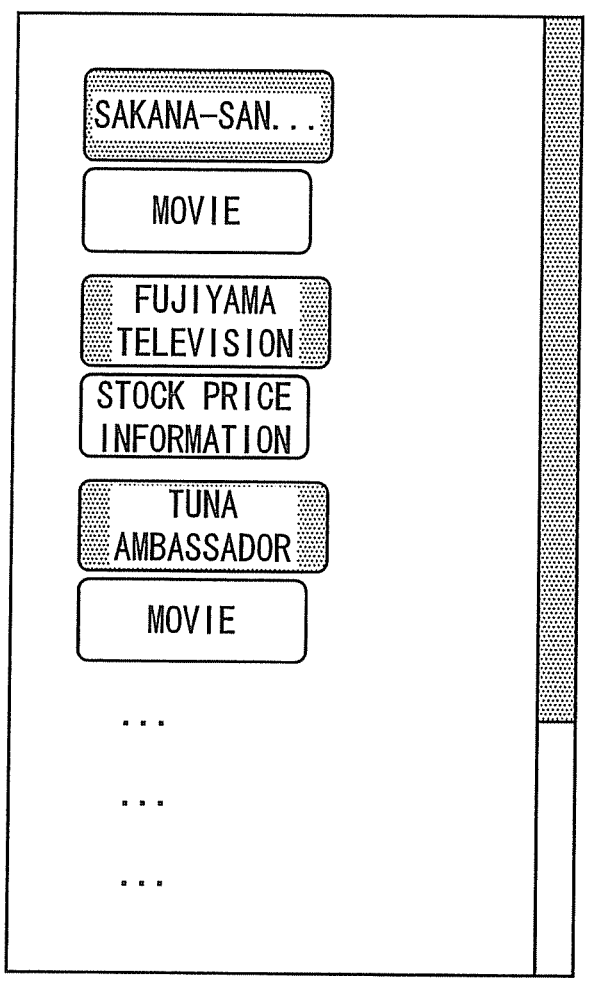
FIG. 8 is a diagram illustrating an example of an arrangement of presented main keywords and a search method.

FIG. 8 is an example of the arrangement of the keywords and the search method thereof represented by the keyword and search method presenting unit 108. Sets of the main keywords and the search methods are presented in order on the touch screen. When there is a sub-keyword, the keyword and search method presenting unit 108 displays that the sub-keyword exists. In the embodiment, a button, such as " . . . " before and after the main keyword, represents that there are further keywords. This button is also a button for developing a selective list. Details will be described later.

Figure 9A:
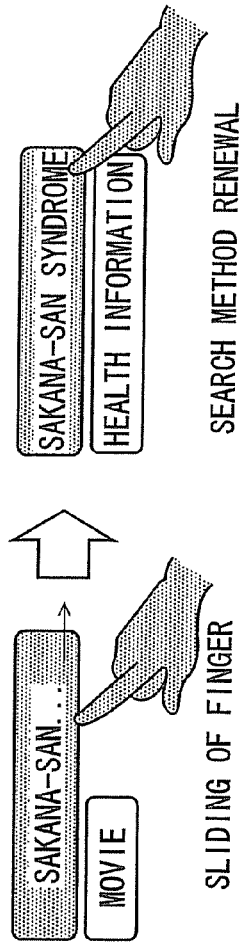
FIGS. 9A-9B are diagrams illustrating a selection example of a sub-keyword.
Figure 9B:
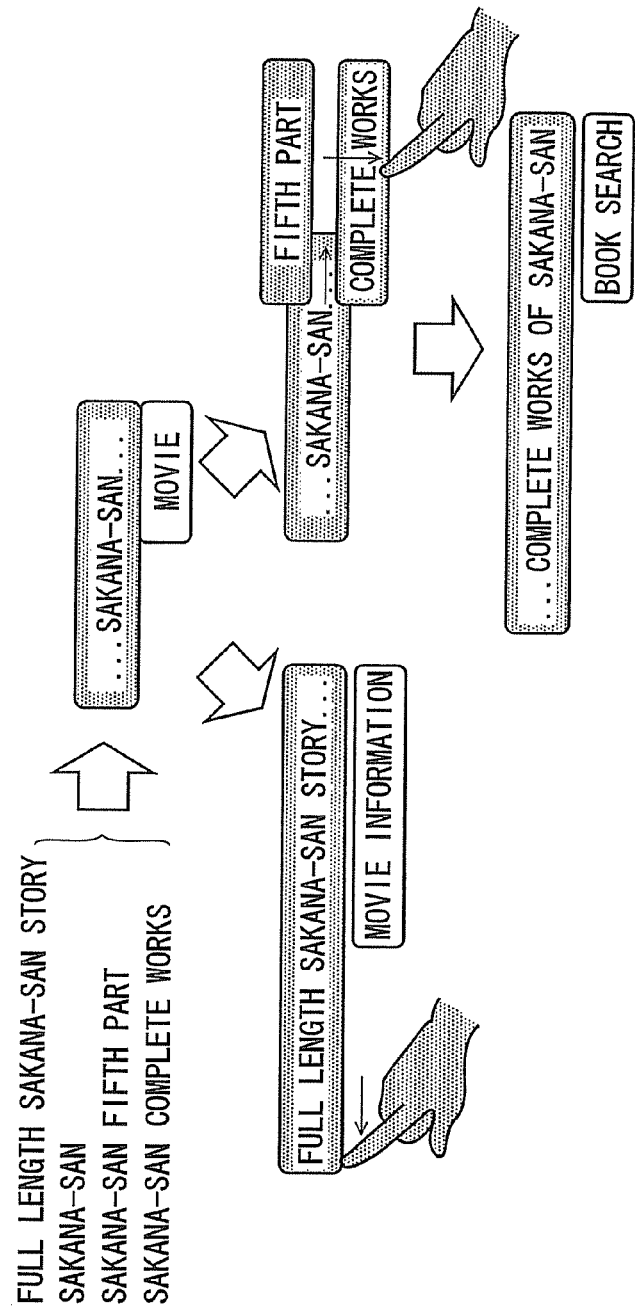

FIGS. 9A and 9B are diagrams explaining a method of selecting a sub-keyword from the presented main keyword. As shown in FIG. 9A, when "Sakana-san . . . " is described and a finger slides over the " . . . " portion, "Sakana-san Syndrome" that is a longer spelling is developed and displayed. At this time, a search method corresponding to the meaning attribute of "Sakana-san Syndrome" is acquired from the search rule shown in FIG. 5 and is renewed and displayed.

As shown in FIG. 9B, when the keyword can be developed forward and backward, " . . . Sakana-san . . . " is displayed. When a finger slides over either the front or the rear side, the sub-keyword can be developed either forward or backward. As shown in lower right side of FIG. 9B, when there is a plurality of candidates, the plurality of sub-keyword candidates are displayed at one time. A sub-keyword is determined by user's selection. As described above, keywords having a number of characters longer than that of the main keyword can be integrated and displayed as the sub-keywords.

Figure 10A:
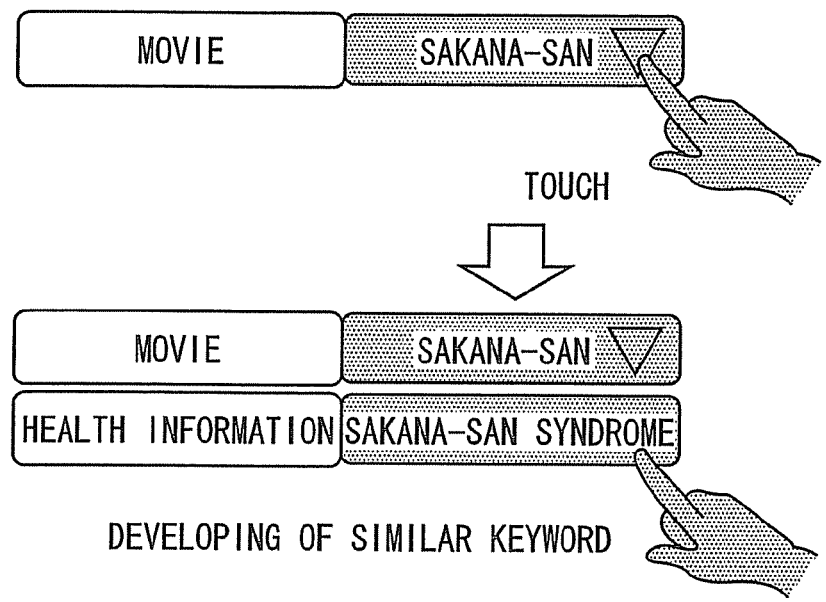
FIGS. 10A-10B are diagrams illustrating a selection example of a sub-keyword.
Figure 10B:
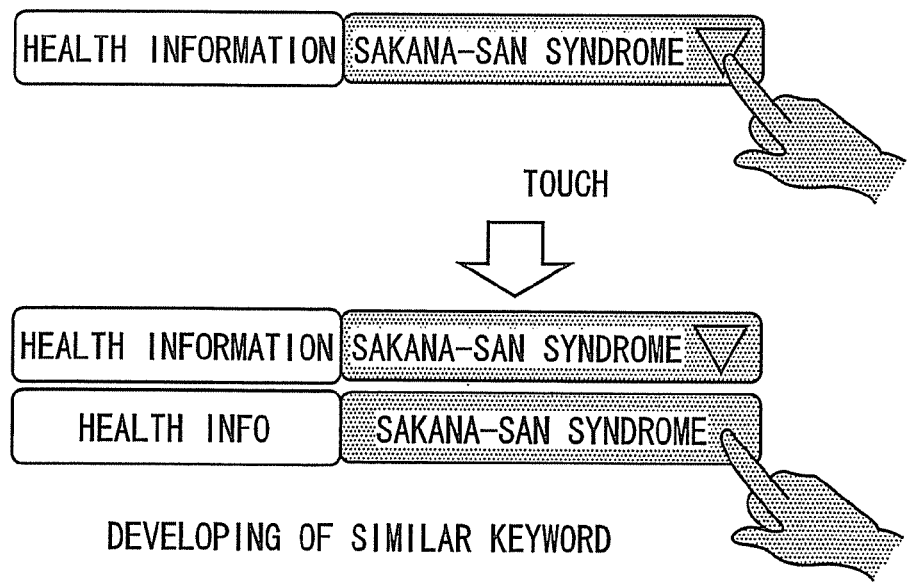

FIGS. 10A and 10B are diagrams illustrating a selection example of a sub-keyword by list display. As shown in FIG. 10A, a list of sub-keywords and search methods is developed by pressing a "downward triangle symbol" button representing that development is possible. In the case of this method, even for similar keywords having no inclusion relation of spelling as shown in FIG. 10B, natural development display is possible for the user.

Figure 11A:
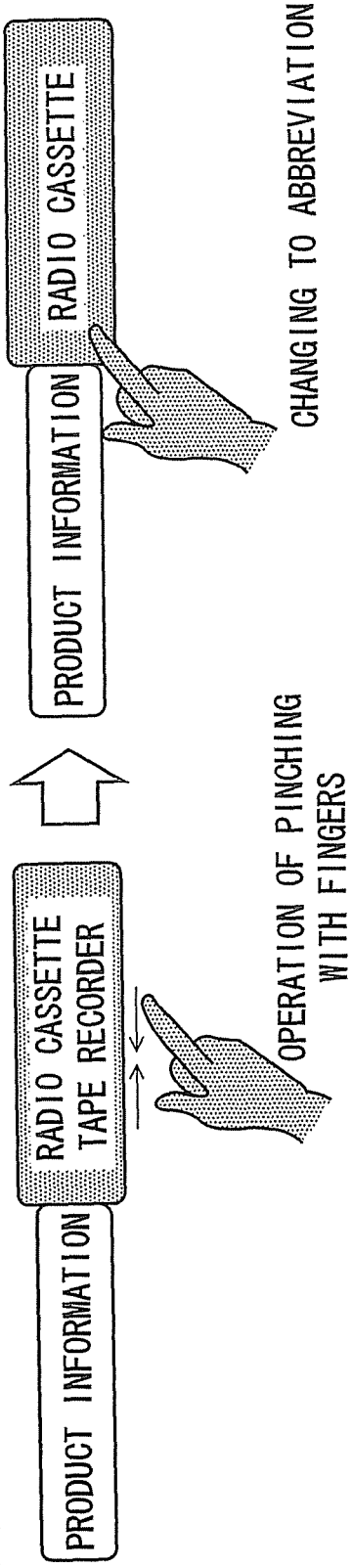
FIGS. 11A-11B are diagrams illustrating a selection example of a sub-keyword.
Figure 11B:
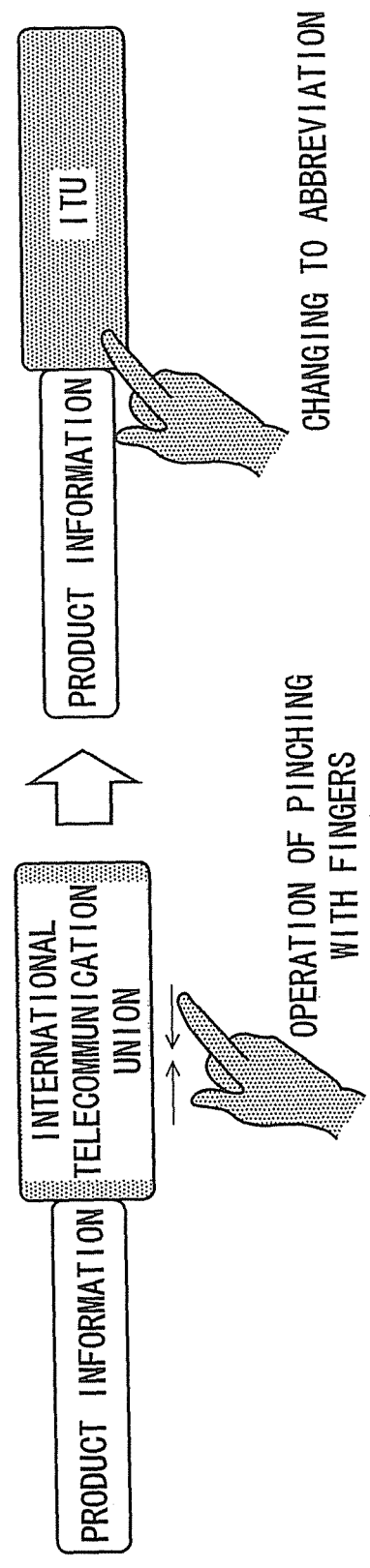

FIGS. 11A and 11B are diagrams illustrating an example of development to a sub-keyword with shorter spelling. The keyword can be converted into spelling of a nickname (e.g., abbreviation) by an operation of pinching the keyword with fingers. FIG. 11A shows a case of converting a keyword described by katakana into an abbreviation, and FIG. 11B shows a case of converting a keyword described in English into an abbreviation.

Statistic information of the keyword selected by the user is acquired by the selection tendency calculating unit 112, and thus it is possible to set the long spelling as the main keyword and the shorter spelling as the sub-keyword as described above.

Figure 12:
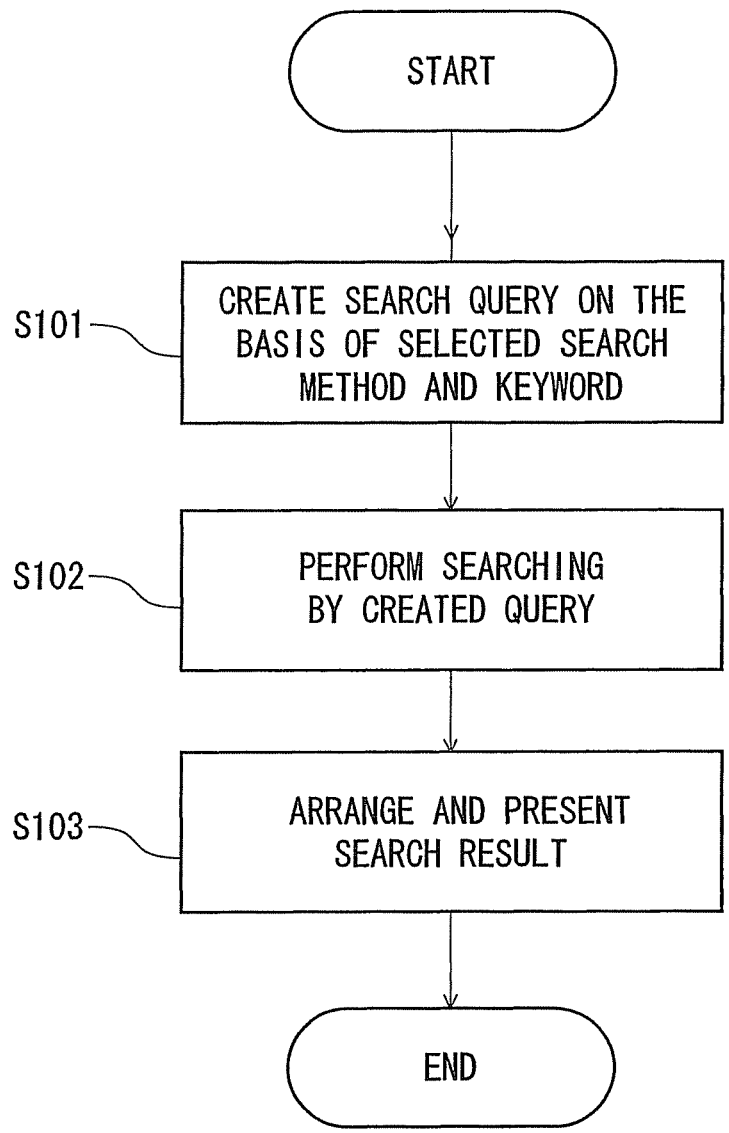
FIG. 12 is a flowchart illustrating an operation of keyword selection according to the embodiment.

Next, a flow of selecting the displayed keyword for searching will be described. FIG. 12 is a flowchart illustrating an operation of keyword selection according to the embodiment.

The user selects the keyword displayed by the keyword and search method presenting unit 108 (Step S101). Then, the search unit 109 performs search using (i) the selected keyword, (ii) the search method corresponding to the meaning attribute of this keyword, (iii) the search service, and (iv) the extension query (Step S102). When there is no extension query in the search rule storing unit 105, the search is performed without adding the extension query.

Figure 13:
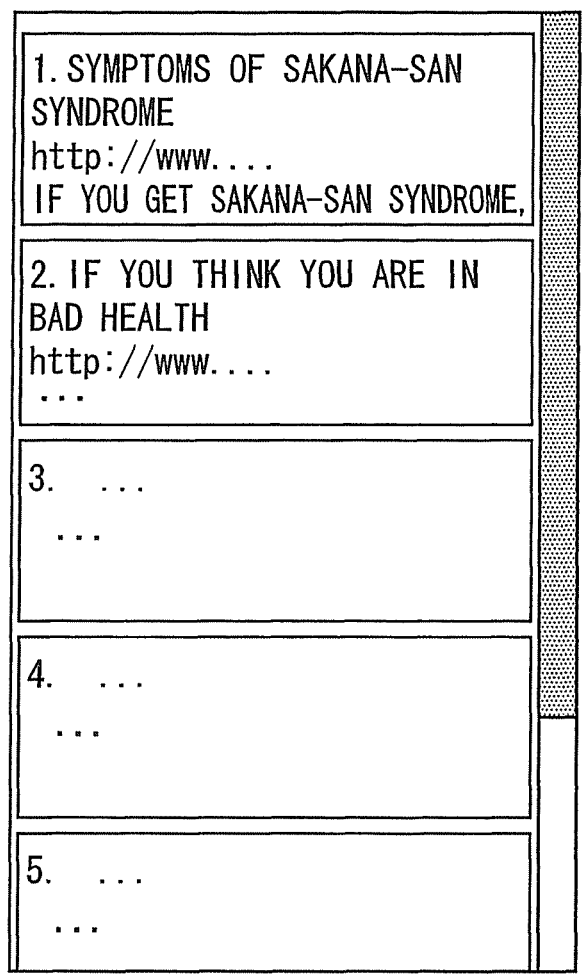
FIG. 13 is a diagram illustrating a display example of a search result according to the embodiment.

The search result displaying unit 110 presents this search result to the user (Step S103). In the embodiment, search using a Web service is assumed. However, search means other than the Web service may be used, for example, database search such as a dictionary stored in the keyword presenting device 100. FIG. 13 is a diagram illustrating a display example of search results when the selected keyword is "Sakana-san Syndrome" as the sub-keyword. Herein, the search result displaying unit 110 is displayed as a window which is separate from the browsing information input unit 101 shown in FIG. 3.

When the user selects one of the displayed search results, it moves to a Web page corresponding thereto, and the next Web page information is input to the browsing information input unit 101. As described above, when the user is browsing the Web page, the keyword and the search method which are used as clues for searching related information can be provided without a complicated operation.

In the embodiment, on the basis of the browsing content of the user, the similar keywords of the keywords that can be used to search the related information are arranged as one title, this title and the search method corresponding to the meaning attribute thereof are displayed. When the title is changed by user's selection operation, the search method can be converted into a search method corresponding to the changed title. Accordingly, the user does not find one keyword from the plurality of representations displayed on the display, but the user can easily select a similar title by an operation of sliding their finger over the one displayed title, and the related information can searched for.

Modified Example

In the browsing information input unit 101, a keyword representing a user's situation may be additionally input, in addition to the Web page. For example, when a Web browser is provided in the mobile terminal, it is conceivable that a word such as "Kawasaki" is input as a keyword representing the present position.

In the embodiment, it is assumed that the keyword presenting device 100 is used in the terminal which is held by a user, but it may be separately configured, such as being a part of the keyword presenting device 100 configured in a server. The keyword presenting device 100 may be applied to a general computer provided with a control device such as a CPU, a storage device such as a ROM and a RAM, an external storage device such as a HDD, a display device such as a display, and an input device such as a keyboard and a mouse.

The keyword presenting device of the embodiments can be realized, for example, by using a general-purpose computer device as basic hardware. An executed program is configured by a module including the above-described functions. The program may be provided in such a manner that the program is recorded on a computer-readable recording medium such as a CD-ROM, a floppy (R) disk, a CD-R, or a DVD in an installable type or executable type file, or the program may be installed in advance in a ROM or the like.

The keyword presenting device can be realized, for example, by using a general-purpose computer device as basic hardware. That is, the browsing information input unit 101, the text body area extracting unit 102, the keyword extracting unit 103, the similar keyword integrating unit 106, the keyword and search method presenting unit 108, the search unit 109, the search result displaying unit 110, and the selection tendency calculating unit 112 can be realized by prompting a processor mounted on the computer device to execute a program. In this case, the keyword presenting device may be realized by installing the program in the computer device in advance, and by storing the program in a storage medium such as a CD-ROM or by distributing the program through a network to appropriately install the program in the computer device. The keyword extraction dictionary and rule storing unit 104, the search rule storing unit 105, the similar keyword integration rule storing unit 107, the search result display unit 110, the selection history storing unit 111, and the related word dictionary storing unit 113 can be realized by appropriately using a storage medium such as a memory built in the computer device or attached to the outside, a hard disk, a CD-R, a CD-RW, a DVD-RAM, and a DVD-R.

Although the embodiments according to the present invention have been described above, the present invention is not limited to the above-mentioned embodiments but can be variously modified. Constituent components disclosed in the aforementioned embodiments may be combined suitably to form various modifications. For example, some of all constituent components disclosed in the embodiments may be removed or may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A keyword presenting device comprising:
    an extraction unit configured to extract a plurality of keywords from a browsing document;
    a determination unit configured to arrange keywords, of the plurality of keywords, with spellings similar to each other to obtain a plurality of groups of similar keywords;
    an integration unit configured to classify keywords of each of the plurality of groups into a main keyword that is a title and at least one sub-keyword, and to associate the main keyword with the sub-keywords for each of the plurality of groups; and
    a presentation unit configured to present the main keywords of respective groups of the plurality of groups,
    wherein the presentation unit is further configured to, in response to one of the main keywords being selected by a user, allow selection of a sub-keyword, with a spelling similar to the one of the main keywords, of the at least one sub-keyword associated with the one of the main keywords.

2. The keyword presenting device according to claim 1, further comprising:
    a storage unit configured to store one or more search rules for determining search methods and search services corresponding to meaning attributes of keywords;
    wherein the integration unit is further configured to acquire the search methods and the search services corresponding to meaning attributes of the main keywords and the sub-keywords using the one or more search rules.

3. The keyword presenting device according to claim 2, wherein the one or more search rules comprise one or more extension queries, and
    wherein the integration unit is further configured to acquire at least one of the one or more extension queries corresponding to the meaning attributes of the main keywords and the sub-keywords.

4. The keyword presenting device according to claim 1, further comprising:
    a calculation unit configured to calculate keyword statistic information from keywords selected from among the main keywords presented by the presentation unit.

5. The keyword presenting device according to claim 1, wherein the integration unit is further configured to classify the keywords into the main keywords and the at least one sub-keyword that includes any of the main keywords and different character strings before and after the main keyword, and to integrate the at least one sub-keyword into the main keywords.

6. The keyword presenting device according to claim 1, wherein, the presentation unit is further configured to, in response to an operation of pinching at least one of the main keywords presented by the presentation unit, convert the at least one of the main keywords into an abbreviation of the at least one of the main keywords.

7. The keyword presenting device according to claim 1, wherein the presentation unit is further configured to present the main keywords of the respective groups so that the main keyword that is associated with the sub-keyword with the spelling similar to the main keyword is visually distinguishable from another main keyword that is not associated with the sub-keyword with the spelling similar to the main keyword.

8. A keyword presenting method comprising:
    extracting a plurality of keywords from a browsing document; arranging keywords with spellings similar to each other among the plurality of keywords to obtain a plurality of groups of similar keywords;
    classifying the keywords of each of the plurality of groups into a main keyword that is a title and at least one sub-keyword;
    associating the main keyword with the at least one sub-keyword for each of the plurality of groups;
    presenting the main keywords of respective groups of the plurality of groups; and
    allowing selection of a sub-keyword, with spelling similar to a specific main keyword of the main keywords, from the at least one sub-keyword associated with the specific main keyword in response to the specific main keyword being selected by a user.

9. The keyword presenting device according to claim 8, wherein the main keywords of the respective groups are presented so that the main keyword that is associated with the sub-keyword with spelling similar to the main keyword and another main keyword that is not associated the sub-keyword with spelling similar to the main keyword are visually distinguishable from each other.

10. A non-transitory computer-readable medium containing a program for causing a computer to perform a series of procedures comprising:
    extracting a plurality of keywords from a browsing document;
    arranging keywords, of the plurality of keywords, having spellings similar to each other to obtain a plurality of groups of similar keywords;
    classifying the keywords of each of the plurality of groups into a main keyword that is a title and at least one sub-keyword;

associating the main keyword with the at least one sub-keyword for each group of the plurality of groups;
presenting the main keywords of respective groups of the plurality of groups; and
in response to receiving a user selection of a specific main keyword of the main keywords, allowing selection of a sub-keyword, with spelling similar to the specific main keyword, from the at least one sub-keyword associated with the specific main keyword.

11. The non-transitory computer-readable medium according to claim 10, wherein the presenting comprises presenting the main keywords of the respective groups so that the main keyword that is associated the sub-keyword with spelling similar to the main keyword is visually distinguishable from another main keyword that is not associated the sub-keyword with spelling similar to the main keyword.

* * * * *